US012380755B2

(12) United States Patent
Haddad

(10) Patent No.: US 12,380,755 B2
(45) Date of Patent: Aug. 5, 2025

(54) METHOD AND SYSTEM FOR ACCESS TO A SECURED BUILDING

(71) Applicant: 1VALET CORP., Gatineau (CA)

(72) Inventor: Hanna Haddad, Gatineau (CA)

(73) Assignee: 1VALET CORP., Gatineau (CA)

( * ) Notice: Subject to any disclaimer, the term of this patent is extended or adjusted under 35 U.S.C. 154(b) by 0 days.

(21) Appl. No.: 17/679,783

(22) Filed: Feb. 24, 2022

(65) Prior Publication Data

US 2022/0237976 A1 Jul. 28, 2022

Related U.S. Application Data

(63) Continuation of application No. 17/041,945, filed as application No. PCT/CA2020/050694 on May 22, 2020, now Pat. No. 11,443,580.

(60) Provisional application No. 62/990,074, filed on Mar. 16, 2020, provisional application No. 62/905,637,
(Continued)

(51) Int. Cl.
*G07C 9/33* (2020.01)
*G06Q 10/083* (2024.01)

(52) U.S. Cl.
CPC .............. *G07C 9/33* (2020.01); *G06Q 10/083* (2013.01)

(58) Field of Classification Search
CPC ................................ G07C 9/33; G06Q 10/083
See application file for complete search history.

(56) References Cited

U.S. PATENT DOCUMENTS

| 7,248,160 B2 * | 7/2007 | Mangan | G06Q 10/0833 |
| | | | 705/333 |
| 8,346,676 B1 * | 1/2013 | Bennett | G06Q 10/08345 |
| | | | 705/333 |

(Continued)

FOREIGN PATENT DOCUMENTS

| CN | 107134071 A | * 9/2017 |
| CN | 107633578 A | 1/2018 |

(Continued)

OTHER PUBLICATIONS

Stanislaw Iwan, "Analysis of parcel locker's efficiency as the last mile delivery solution—the results of the research in Poland", published by Elsevier in 2015, all pages (Year: 2015).*

(Continued)

*Primary Examiner* — Omar Zeroual
(74) *Attorney, Agent, or Firm* — Sterne, Kessler, Goldstein & Fox P.L.L.C.

(57) ABSTRACT

The present invention provides for methods and systems for accessing a secured building. The method includes retrieving information from a code associated with a carrier and an address. The code may be a barcode with encoded information. The method further includes confirming that the address is associated with the secured building and further validating the carrier as an authorized carrier by an identification of the carrier. The method further includes validating a status associated with the information to be one of: in transit; and out for delivery. Upon positive response of the status, the method further includes allowing access to the secured building. In some embodiments, prior to allowing access to the secured building, the method further includes checking that an update to the status is within 24 hours.

18 Claims, 5 Drawing Sheets

Related U.S. Application Data filed on Sep. 25, 2019, provisional application No. 62/852,605, filed on May 24, 2019.

(56) References Cited

U.S. PATENT DOCUMENTS

| | | | |
|---|---|---|---|
| 8,943,187 B1* | 1/2015 | Saylor | G07C 9/00857 |
| | | | 709/225 |
| 9,652,912 B2* | 5/2017 | Fadell | G06Q 10/08 |
| 9,691,199 B1* | 6/2017 | Rapp | G07C 9/00571 |
| 9,754,331 B1* | 9/2017 | Beckelman | G06Q 50/12 |
| 10,019,860 B1* | 7/2018 | Kim | G07C 9/00896 |
| 10,198,887 B2* | 2/2019 | Ogishi | G07C 9/38 |
| 10,733,328 B1* | 8/2020 | Perkins | G06F 21/86 |
| 10,846,646 B1* | 11/2020 | Lee | G06Q 10/08355 |
| 10,861,265 B1* | 12/2020 | Merkley | G06V 20/52 |
| 11,074,790 B2* | 7/2021 | Scalisi | H04N 23/56 |
| 11,144,868 B1* | 10/2021 | McBride | G06Q 10/0834 |
| 11,144,873 B2* | 10/2021 | Fee | G06Q 20/00 |
| 11,184,589 B2* | 11/2021 | Scalisi | G08B 13/19684 |
| 11,250,373 B1* | 2/2022 | Condron | H04W 4/029 |
| 11,443,580 B2 | 9/2022 | Haddad | |
| 11,562,610 B2* | 1/2023 | Alamin | G07C 9/00571 |
| 11,625,675 B2* | 4/2023 | Levy | G07C 9/33 |
| | | | 705/339 |
| 11,625,971 B2 | 4/2023 | Dotterweich et al. | |
| 2002/0138548 A1 | 9/2002 | Neebe et al. | |
| 2002/0156645 A1* | 10/2002 | Hansen | G07F 17/13 |
| | | | 705/26.1 |
| 2003/0135304 A1 | 7/2003 | Sroub et al. | |
| 2004/0181570 A1 | 9/2004 | Kaneko | |
| 2004/0229569 A1* | 11/2004 | Franz | H04M 3/16 |
| | | | 455/66.1 |
| 2004/0254808 A1* | 12/2004 | Bennett | G06Q 10/10 |
| | | | 705/26.1 |
| 2006/0208852 A1* | 9/2006 | Wenzlik | G07C 9/00912 |
| | | | 340/5.2 |
| 2006/0229895 A1* | 10/2006 | Kodger | G06Q 10/083 |
| | | | 705/333 |
| 2007/0032221 A1* | 2/2007 | Badt, Jr. | H04W 12/082 |
| | | | 455/410 |
| 2007/0247277 A1* | 10/2007 | Murchison | G07C 9/00896 |
| | | | 340/5.2 |
| 2008/0004995 A1* | 1/2008 | Klingenberg | G06Q 10/0832 |
| | | | 705/28 |
| 2008/0082257 A1 | 4/2008 | Lee | |
| 2008/0129498 A1* | 6/2008 | Howarter | G08B 3/10 |
| | | | 340/541 |
| 2009/0119232 A1 | 5/2009 | Mercier et al. | |
| 2010/0094769 A1 | 4/2010 | Davidson et al. | |
| 2011/0130134 A1* | 6/2011 | Van Rysselberghe | A47G 29/141 |
| | | | 455/422.1 |
| 2013/0314210 A1* | 11/2013 | Schoner | G06Q 10/06 |
| | | | 340/8.1 |
| 2014/0149308 A1* | 5/2014 | Ming | G06Q 10/0833 |
| | | | 705/333 |
| 2014/0190081 A1* | 7/2014 | Wanjohi | A47G 29/126 |
| | | | 49/504 |
| 2014/0258168 A1 | 9/2014 | Crawford | |
| 2014/0267740 A1* | 9/2014 | Almomani | G07C 9/00182 |
| | | | 348/156 |
| 2014/0340196 A1* | 11/2014 | Myers | G07C 9/00309 |
| | | | 340/5.61 |
| 2015/0081583 A1* | 3/2015 | Butler | H04W 4/025 |
| | | | 705/333 |
| 2015/0106295 A1* | 4/2015 | Robinson | G06F 21/62 |
| | | | 705/339 |
| 2015/0106296 A1 | 4/2015 | Robinson et al. | |
| 2015/0109104 A1* | 4/2015 | Fadell | G08B 27/005 |
| | | | 340/5.7 |
| 2015/0112885 A1* | 4/2015 | Fadell | G08B 29/185 |
| | | | 705/330 |
| 2015/0112887 A1 | 4/2015 | Camp | |
| 2015/0120529 A1* | 4/2015 | Faaborg | G06Q 10/083 |
| | | | 705/330 |
| 2015/0142692 A1* | 5/2015 | Gillen | G06Q 10/083 |
| | | | 705/330 |
| 2015/0145643 A1* | 5/2015 | Fadell | G07C 9/27 |
| | | | 340/5.51 |
| 2015/0154850 A1 | 6/2015 | Fadell et al. | |
| 2015/0156030 A1* | 6/2015 | Fadell | G06Q 10/083 |
| | | | 700/90 |
| 2015/0156031 A1 | 6/2015 | Fadell et al. | |
| 2015/0178676 A1* | 6/2015 | Carr | G06Q 10/0836 |
| | | | 705/332 |
| 2015/0186840 A1 | 7/2015 | Torres et al. | |
| 2015/0312531 A1* | 10/2015 | Samad | H04N 7/186 |
| | | | 348/143 |
| 2016/0066733 A1* | 3/2016 | Gozar | A47G 29/141 |
| | | | 232/18 |
| 2016/0216106 A1 | 7/2016 | Motoyama | |
| 2016/0219254 A1* | 7/2016 | Hu | H04N 7/186 |
| 2016/0247344 A1* | 8/2016 | Eichenblatt | A47G 29/141 |
| 2016/0307380 A1* | 10/2016 | Ho | G10L 17/00 |
| 2016/0335595 A1* | 11/2016 | Levy | G06Q 10/087 |
| 2017/0098188 A1 | 4/2017 | Aryeetey et al. | |
| 2017/0124510 A1* | 5/2017 | Caterino | A47G 29/141 |
| 2017/0124547 A1* | 5/2017 | Natarajan | G06Q 20/202 |
| 2017/0214802 A1* | 7/2017 | Gaspard | H04M 7/1295 |
| 2017/0220976 A1 | 8/2017 | Schmidt | |
| 2017/0262786 A1 | 9/2017 | Khasis | |
| 2017/0262820 A1* | 9/2017 | Al Salah | G07C 5/02 |
| 2017/0286905 A1 | 10/2017 | Richardson et al. | |
| 2017/0293885 A1* | 10/2017 | Grady | G06K 7/10009 |
| 2017/0337511 A1 | 11/2017 | Shroff et al. | |
| 2018/0060800 A1* | 3/2018 | Robinson | G07C 9/00571 |
| 2018/0061154 A1* | 3/2018 | Scalisi | H04N 7/186 |
| 2018/0075681 A1 | 3/2018 | Scalisi et al. | |
| 2018/0091503 A1* | 3/2018 | Tang | G07C 9/00912 |
| 2018/0096287 A1 | 4/2018 | Senger | |
| 2018/0121872 A1* | 5/2018 | Walsh | G06Q 10/08355 |
| 2018/0165631 A1* | 6/2018 | Romero | G08B 13/19665 |
| 2018/0165637 A1* | 6/2018 | Romero | G06Q 10/0836 |
| 2018/0170674 A1* | 6/2018 | Luckay | B65G 1/137 |
| 2018/0186454 A1* | 7/2018 | Luckay | B64F 1/32 |
| 2018/0190062 A1* | 7/2018 | Robinson | G06Q 10/0836 |
| 2018/0232979 A1* | 8/2018 | Kusens | G07C 9/28 |
| 2018/0305125 A1* | 10/2018 | Guo | B25J 13/08 |
| 2019/0019135 A1* | 1/2019 | Vij | G06Q 10/083 |
| 2019/0066516 A1* | 2/2019 | Kuhara | G05D 1/81 |
| 2019/0087775 A1* | 3/2019 | Buehre | G06Q 10/0833 |
| 2019/0088054 A1* | 3/2019 | Wulf | G06Q 10/0832 |
| 2019/0130349 A1* | 5/2019 | Ferguson | G06Q 10/08355 |
| 2019/0137290 A1 | 5/2019 | Levy et al. | |
| 2019/0205831 A1 | 7/2019 | Kanaoka et al. | |
| 2019/0213573 A1 | 7/2019 | Zelten et al. | |
| 2019/0259232 A1* | 8/2019 | Nandakumar | G07C 9/00896 |
| 2019/0265717 A1* | 8/2019 | McHale | G06Q 10/0832 |
| 2019/0279485 A1 | 9/2019 | Vanblon et al. | |
| 2020/0012245 A1* | 1/2020 | Marin Pulido | G06Q 10/0836 |
| 2020/0151982 A1 | 5/2020 | Shell et al. | |
| 2020/0158414 A1* | 5/2020 | Farlotti | G07F 9/105 |
| 2020/0160264 A1* | 5/2020 | Silverman | G06Q 10/06315 |
| 2020/0170432 A1* | 6/2020 | Parvarandeh | A47G 29/20 |
| 2020/0226706 A1* | 7/2020 | Ramarao | G06Q 10/08355 |
| 2020/0250614 A1* | 8/2020 | Zhu | G06Q 10/0836 |
| 2020/0281386 A1* | 9/2020 | Knox | A47G 29/22 |
| 2020/0302388 A1* | 9/2020 | Merle | G06Q 10/0833 |
| 2020/0312068 A1* | 10/2020 | Scalisi | G06Q 10/0833 |
| 2020/0327757 A1* | 10/2020 | Kelley | G07C 9/00309 |
| 2020/0349796 A1 | 11/2020 | Gokcebay et al. | |
| 2020/0402336 A1* | 12/2020 | Levy | G07C 9/00817 |
| 2021/0108935 A1 | 4/2021 | Koohi et al. | |
| 2021/0127881 A1* | 5/2021 | Estill | A47G 29/20 |
| 2021/0182786 A1* | 6/2021 | Estill | H04W 4/029 |
| 2021/0217261 A1 | 7/2021 | Green | |
| 2021/0407234 A1* | 12/2021 | Li | G07C 9/00817 |
| 2022/0027846 A1* | 1/2022 | Shroff | G06Q 10/0833 |
| 2022/0044509 A1 | 2/2022 | Haddad | |
| 2022/0076517 A1 | 3/2022 | Haddad et al. | |
| 2022/0101258 A1* | 3/2022 | Fujisawa | G07C 9/22 |
| 2022/0112760 A1* | 4/2022 | Demele | E05B 47/0012 |

(56) References Cited

U.S. PATENT DOCUMENTS

| | | | |
|---|---|---|---|
| 2022/0114546 A1 | 4/2022 | Carter | |
| 2022/0117429 A1* | 4/2022 | Morris | E05G 1/10 |
| 2022/0202224 A1* | 6/2022 | Oksman | A47G 29/141 |
| 2022/0370668 A1* | 11/2022 | Moton, Jr. | G07F 17/12 |
| 2024/0062601 A1* | 2/2024 | Corder | G07C 9/00896 |
| 2024/0211853 A1* | 6/2024 | Chacko | G06Q 10/0833 |

FOREIGN PATENT DOCUMENTS

| | | | | |
|---|---|---|---|---|
| EP | 3817408 A1 | | 5/2021 | |
| WO | WO-0130129 A2 | * | 5/2001 | A47G 29/141 |
| WO | WO-0131827 A2 | | 5/2001 | |
| WO | WO-03081560 A1 | | 10/2003 | |
| WO | WO-2007084357 A2 | | 7/2007 | |
| WO | WO-2012116400 A1 | * | 9/2012 | G07C 9/00571 |
| WO | WO-2015159281 A1 | * | 10/2015 | G07C 9/00174 |
| WO | WO-2016081794 A1 | | 5/2016 | |
| WO | WO-2016131043 A1 | * | 8/2016 | A47G 29/124 |
| WO | WO-2017058924 A1 | | 4/2017 | |
| WO | WO-2017178622 A1 | | 10/2017 | |
| WO | WO-2017186287 A1 | | 11/2017 | |
| WO | WO-2017192276 A1 | * | 11/2017 | G06Q 10/0631 |
| WO | WO-2018029593 A1 | | 2/2018 | |
| WO | WO-2018185772 A1 | * | 10/2018 | A47G 29/1201 |
| WO | WO-2019200088 A1 | * | 10/2019 | B64D 1/22 |
| WO | WO-2019204276 A1 | * | 10/2019 | E05F 15/668 |
| WO | WO-2020171242 A1 | * | 8/2020 | B60R 21/01538 |
| WO | WO-2022243373 A2 | * | 11/2022 | G07C 9/00174 |

OTHER PUBLICATIONS

Ben Popper, Amazon Key is a new service that let's couriers unlock your front door, published by theverge.com on Oct. 25, 2017, all pages (Year: 2017).*

Tallam, Deepak, "Unattended delivery to the home: and assessment of the security implications", published International Journal of Retail and distribution management in 2003, all pages (Year: 2003).*

Mashood Mukhtar, "GPS based advanced Vehicle Tracking and Vehicle control system", published by I.J. Intelligent System and Applications in 2015, all pages (Year: 2015).*

Extended European Search Report and Written Opinion of the European Patent Office for European Application No. 20765181, mailed Jan. 4, 2022, 10 pages.

Mukhtar, M., "GPS based Advanced Vehicle Tracking and Vehicle Control System," I.J. Intelligent System and Applications 3:1-12, MECS, Hong Kong (Feb. 2015).

Popper, B., "Amazon Key is a new service that lets couriers unlock your front door," theverge.com, accessed at https://www.theverge.com/2017/10/25/16538834/amazon-key-in-home-delivery-unlock-door-prime-cloud-cam-smart-lock, accessed on Oct. 25, 2017, 7 pages.

* cited by examiner

METHOD AND SYSTEM FOR ACCESS TO A SECURED BUILDING

CROSS-REFERENCE TO RELATED APPLICATIONS

This application is a continuation of U.S. patent application Ser. No. 17/041,945, filed on Sep. 25, 2020, which is a national phase entry of PCT/CA2020/050694, filed on May 22, 2020, which claims priority to U.S. Provisional Application No. 62/852,605, filed on May 24, 2019, U.S. Provisional Application No. 62/905,637, filed on Sep. 25, 2019, and U.S. Provisional Application No. 62/990,074, filed on Mar. 16, 2020. The contents of each of these applications are incorporated herein in their entirety.

FIELD OF THE DISCLOSURE

The present disclosure generally relates to the field of building security. In particular embodiments or aspects, the disclosure relates to methods and systems for accessing a secured building.

BACKGROUND

Access to a secured building, for a non-tenant, generally require a tenant's presence at the building to permit access. Similarly, for service providers who may require access to a building, or a unit within the building, generally require a tenant's presence at the building and/or the unit to permit access. Service providers may include any party who requires access to the building and/or a unit within a building to provide a service. The service may be a plumbing service, and electrical service, a delivery of a package, mail, food, etc.

A service provider attempting to access a building may be unable to provide its services if a tenant is not present to permit access, where required, or otherwise, the tenant is unable to permit access as required according to the building security protocols. Accordingly Accordingly, there is a need for improving the access to a secured building for service providers.

SUMMARY

It is an object of the present disclosure to provide a method and system for accessing a secured building.

An aspect of the invention provides for a method of accessing a secured building. The method includes retrieving information from a code associated with a carrier and an address. The method further includes confirming that the address is associated with the secured building. The method further includes validating the carrier as an authorized carrier. The method further includes validating a status associated with the information to be one of: in transit; and out for delivery. The method further includes allowing access to the secured building. In some embodiments, prior to allowing access to the secured building, the method further includes checking an that update to the status is within 24 hours. In some embodiments the step of validating the carrier as an authorized carrier includes determining an identification of the carrier associated with the information. In some embodiments the code is a barcode. In some embodiments the barcode is one of: 1 dimensional linear bar code; 2-dimensional bar code, an image, specialized augmented postal code; intelligent mail barcode; and electronic product code. In some embodiments the step of allowing access to the secured building comprises opening a secured door. In some embodiments the information is a tracking code. In some embodiments the method further includes displaying an access code for accessing a locker system including a locker associated with the address. In some embodiments, the method further includes receiving, by the locker system, the access code. In some embodiments, the method further includes validating the access code. In some embodiments, the method further includes allowing access to the locker. In some embodiments, the step of validating the access code includes: checking that a time window associated the access code is not expired. In some embodiments, the method further includes retrieving the information from the code associated with carrier and the address. In some embodiments, the method further includes confirming that the address is associated with the secured building. In some embodiments, the method further includes validating the carrier as the authorized carrier. In some embodiments, the method further includes validating a second status associated with the information to be one of in transit and out for delivery. In some embodiments, the method further includes allowing access to a locker system including a locker associated with the address. In some embodiments, the method further includes sending a message to a device associated with the address, the message indicating that access to the secured building has been granted for the carrier. In some embodiments, the method further includes sending a message to a device associated with the address, the message indicating that access to the locker has been granted for the carrier. In some embodiments, the method further includes the device is a mobile of a tenant associated with the address.

Another aspect of the invention provides for a system for accessing a secured building. The system includes at least one processor. The system further includes a non-transient computer readable memory for storing instructions which when executed by the at least one processor cause the system to perform the methods described herein. For example, such a system is caused to retrieve information from a code associated with a carrier and an address. The system is further caused to confirm that the address is associated with the secured building. The system is further caused to validate the carrier as an authorized carrier. The system is further caused to validate a status associated with the information to be one of in transit; and out for delivery. The system is further caused to allow access to the secured building. In some embodiments, the instructions further cause the system to check that an update to the status is within 24 hours. In some embodiments, the instructions which cause the system to validating the carrier as an authorized carrier includes: instructions to determine an identification of the carrier associated with the information. In some embodiments, the code is a barcode. In some embodiments, the barcode is one of: 1 dimensional linear bar code; 2-dimensional bar code, an image, specialized augmented postal code; intelligent mail barcode; and electronic product code. In some embodiments, the instructions which cause the system to allow access to the secured building includes: instructions to open a secured door. In some embodiments, the information is a tracking code. In some embodiments, the instructions further cause the system to: display an access code for accessing a locker system including a locker associated with the address. In some embodiments, instructions further cause the system to receive, by the locker system, the access code. In some embodiments, instructions further cause the system to validating the access code. In some embodiments, instructions further cause the system to allow access to the locker. In some embodiments, the instructions which cause the system to validating the access code includes: instructions to check that a time window associated the access code is not expired. In some embodiment, the instructions further cause the system to retrieve the information from the code associated with carrier and the address. In some embodiments, instructions further cause the system to confirm that the address is associated with the secured building. In some embodiments, instructions further cause the system to validate the carrier as an authorized carrier. In some embodiments, instructions further cause the system to validate a second status associated with the information to be one of: in transit; and out for delivery. In some embodiments, instructions further cause the system to allow access to the locker system including a locker associated with the address. In some embodiments, instructions further cause the system to send a message to a device associated with the address, the message indicating that access to the secured building has been granted for the carrier. In some embodiments, instructions further cause the system to send a message to a device associated with the address, the message indicating that access to the locker has been granted for the carrier. In some embodiments, the device is a mobile of a tenant associated with the address.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

Throughout the appended drawings, like features are identified by like reference numerals.

DETAILED DESCRIPTION

Embodiments described herein provide methods and systems for access to a secured building. Although example embodiments are described in reference to a service provider delivering a package, a person skilled in the art may apply the methods and systems as described by example embodiments herein for access to a building in the case of other service providers. Accordingly, delivery a package is but one example of a service provider, and thus example embodiments described herein are not limited to such example.

Every day, millions of packages or parcels are delivered throughout the world. In delivering the packages, service providers, for example, package delivery companies ("carriers") use various tracking mechanisms to ensure efficient and effective delivery of the packages. When a sender delivers a package (sends a package for delivery), the carriers/service provider attach an information label including a unique code, such as a bar code (or barcode) to the package. The barcode contains information identifying the package, the sender, sender's address, the recipient, the recipient's address and other information relating to the status of the delivery (tracking information). The tracking information can be used by the carrier personnel, the sender, and/or recipient to determine the status of the delivery.

Despite the delivery mechanisms and the availability of the tracking information used by the carriers, not all packages are delivered to the recipients. One common reason for packages not being delivered to the recipient is because the recipient is not available to receive the package when the delivery person is at the recipient's address. In such circumstances, the carrier delivery person would attempt to deliver the package at a later time hoping that the recipient would be available to receive the package, or the delivery person would leave the package at a nearby carrier center for pick up by the recipient.

Similar problems are also likely for other service providers who require access to the building, such as an electrician, a plumber, a food delivery person, etc.

Figure 1:
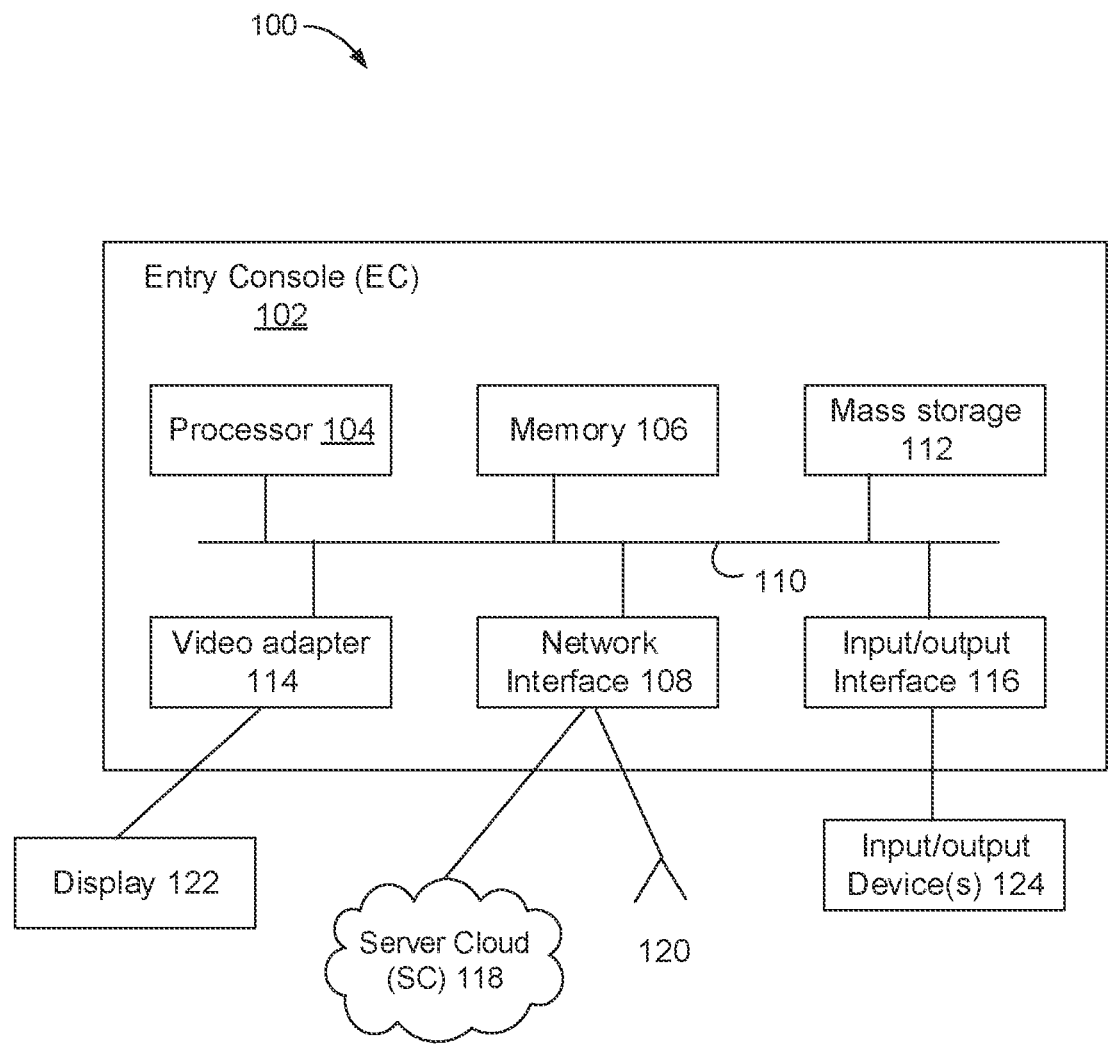
FIG. 1 is a block diagram of a built-in entry console within a computing and communications environment used for implementing devices and methods according to an embodiment of the present invention.

FIG. 1 is a block diagram of a built-in entry console (EC) 102 within a computing and communications environment 100 used for implementing the devices and methods disclosed herein. In some embodiments, the EC 102 is a device that connects to network infrastructure over a radio interface. In some embodiments, EC 102 is a Machine Type Communications (MTC) device (also referred to as a machine-to-machine (m2m) communication device). The EC 102 device may contain multiple instances of a component, such as multiple processors, memories, transmitters, receivers, etc. The EC 102 typically includes a processor 106, such as a Central Processing Unit (CPU), I/O interface 116 to connect with I/O devices (such as a barcode scanner and an access door), a memory 106, a network interface 108 and a bus 110 to connect the components of EC 102. EC 102 may optionally also include components such as a mass storage device 112, a video adapter 114 (shown in dashed lines).

The memory 106 may comprise any type of non-transitory system memory, readable by the processor 106. The bus 110 may be one or more of any type of several bus architectures including a memory bus or memory controller, a peripheral bus, or a video bus.

The one or more network interfaces 108, may include at least one of a wired network interface and a wireless network interface. The EC 102 can connect wirelessly to the console's cloud server 118 via network interface(s) 108 for sending and receiving information. The EC 102 can also include a radio access network interface 120 for connecting to other devices over a radio link.

The mass storage 112 may comprise any type of non-transitory storage device configured to store data, programs, and other information and to make the data, programs, and other information accessible via the bus 110. In the illustrated embodiment, mass storage 112 is distinct from memory 106 where it is included, and may generally perform storage tasks compatible with higher latency, but may generally provide lesser or no volatility. In some embodiments, mass storage 112 may be integrated with a memory 106 to form a heterogeneous memory.

The I/O interface 116 is connected to I/O device(s) 124 such as a barcode scanner capable of reading a barcode attached to packages for delivery. The EC 102 is also connected to an access door used by a delivery person in delivering packages. The EC 102 can grant access to a delivery person to deliver a package where a package passes the verification procedure described elsewhere herein. The EC 102 grants access by opening a door permitting the delivery person to deposit the package.

The EC 102 can also be coupled to a touch-screen I/O device 124 for permitting the delivery person to manually input information into the EC 102. The optional video adapter 114 (shown in dashed lines) provides interfaces to couple the EC 102 to a display for providing information to the delivery person.

In some embodiments, EC 102 is a built-in standalone device that can be installed in any property used for receiving one or more delivery packages. Such properties include any multi-unit/tenant property.

Figure 2:
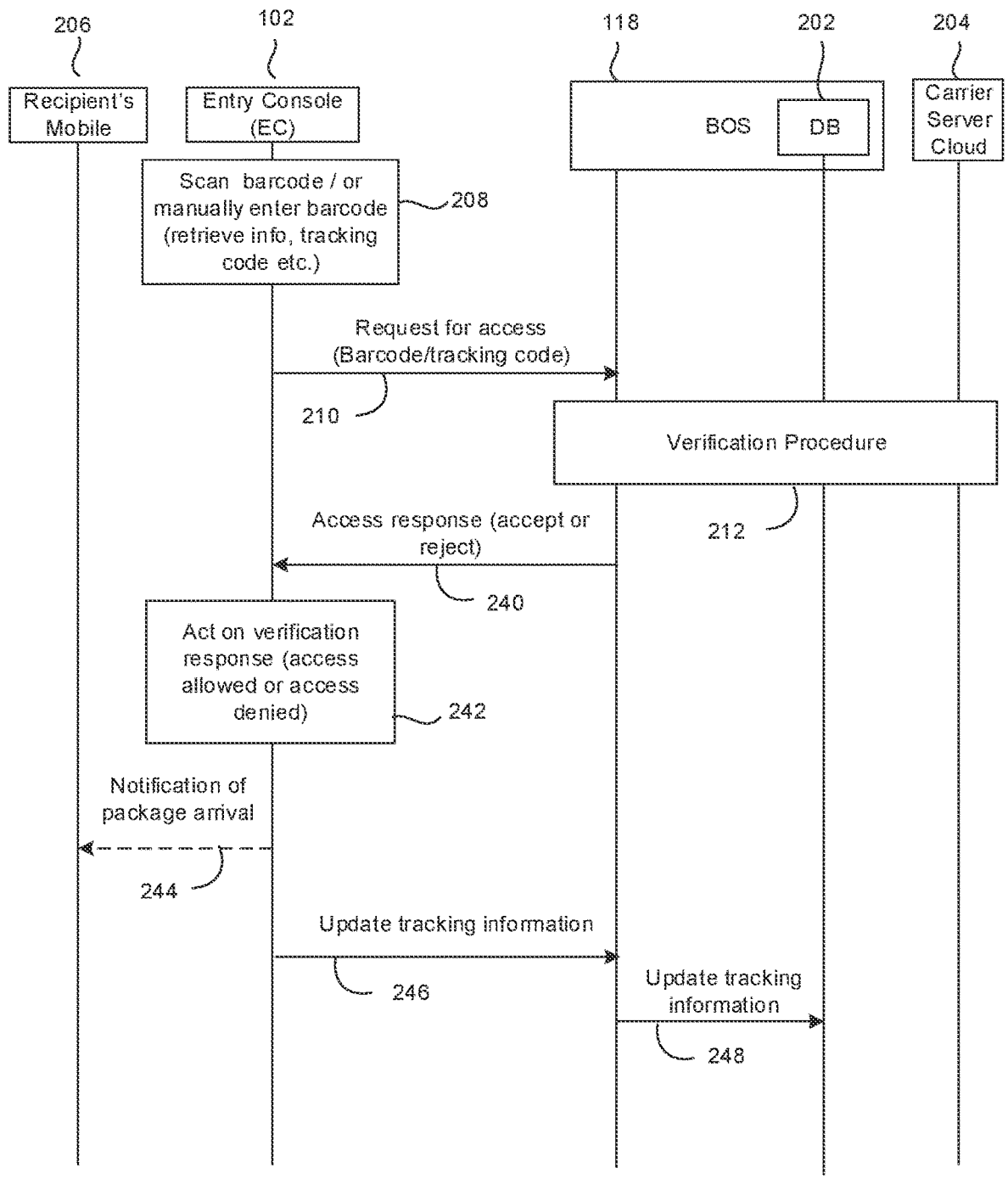
FIG. 2 is a call flow diagram of a package delivery procedure according to an embodiment of the present invention.

FIG. 2 is a call flow diagram of a package delivery procedure according to an embodiment of the present invention. In an embodiment, the package delivery procedure begins with a delivery person having arrived at the package delivery destination, the recipient's address, which would be indicated on the information label attached to the package. At step 208, the delivery person, using the barcode scanner device 124, scans the unique barcode included as part of the information label attached to the package. Alternatively, the delivery personnel can manually enter the barcode number disclosed on the information label using the touch screen of the EC 102.

A code may be any form of information that a service provider may use to access a secured building. In the case of package delivery, a code may be a barcode.

A barcode is an encoded image (representation of data), usually displayed with black and white lines, but also in other variations, in various patterns that contains information that is readable by a machine. Barcodes may take various forms including non-specific 1 dimensional (1D) linear barcodes, 2-dimensional (2D) matrix barcodes, specialized augmented postal codes such as Postal Alpha Numeric Encoding Technique (PLANET), Postal Numeric Encoding Technique (POSTNET), Intelligent Mail barcodes, and other electronic product codes (EPC-s).

A code, for example, a barcode, includes various information, for example, a tracking code from which the following information can be determined: carrier type (the package delivery company), the sender information containing the sender's address, the recipient information containing the recipient's address, and other relevant information (packaging information). Further, the tracking code is associated with tracking information that is updated at the various stages of the delivery. The tracking information can be obtained via the tracking code to inform the sender and/or the recipient of the status of the delivery. All such information is stored and updated in a database (DB) 202 accessible by the EC 102.

Tracking information is gathered at various stages of the package delivery and maintained in the DB 202. Tracking information may be gathered by reporting the arrival and/or departure of the package at the various stages of the packing delivery. At each stage, information including the identity of the package, the location, the time, and the status of the delivery, for example, "in-transit" and "out for deliver" can be uploaded and updated to the DB 202. Alternatively, tracking information may be gathered using Global Positioning System (GPS)-based vehicle tracking system, and/or beacons to locate the delivery vehicle that contains the package and record the tracking information in a real-time to DB 202. Additional information related to the package may also be gathered, for example package information relating to the temperature, humidity, pressure, acceleration, elevation, and exposure to light at different time points, which may be relevant for delicate or perishable packages.

The package information including the tracking information is maintained in a DB 202, which can be but need not be internal to the server cloud (SC) 118. The DB 202 may also within a carrier's server cloud (CSC) 204 accessible by the console's BOS 118. Alternatively, the BOS 118 may use both an internal DB 202 and an external database. The external data base may be within the CSC 204 or a separate entity, in which the external entity/DB may be accessed by both the console's BOS 118 and the CSC 204.

The delivery personnel can use the barcode scanner 124 to scan 208 the barcode. Alternatively, the delivery personnel can manually enter the barcode number disclosed on the information label using the touch screen I/O device 124. The delivery personnel may manually enter the barcode number in situations where the barcode scanner is unable to read the barcode for whatever reason.

The EC 102 retrieves information 208 embedded in the scanned barcode, for example, a tracking code, from which the following information can be determined: carrier type (the package delivery company), the sender information containing the sender's address, the recipient information containing the recipient's address, and other relevant information (packaging information). Further, the tracking code is associated with tracking information that is updated at the various stages of the delivery. The tracking information can be obtained via the tracking code to inform the sender and/or the recipient of the status of the delivery.

The EC forwards 210 the retrieved information to the Building Operating System (BOS) 118. Using the retrieved information, the BOS 118 and CSC 204 perform a verification procedure 212 to ensure that the package is indeed a legitimate package addressed to the recipient. Following the verification procedure 212, the BOS 118 provides a response 240 instructing the EC 102 to permit or deny entry to a door associated with the recipient's address provided in the packaging information. The door associated with the recipient's address provided in the packaging information may be a door for providing access to a locker system for depositing the package to a locker associated with the recipient. The response may be a positive response, allowing the delivery person access via instructing the EC 102 to open the door, or a negative response, denying access to the door.

The EC 102 will then act on the response 242 from the BOS 118. If the response 240 is a positive response, for example, "access allowed", the EC 102 will open the door associated with the recipient's address for the delivery person to access the locker system for depositing the package. The EC 102 may display an access code that may be used at the locker system to access the recipient's locker/mailbox.

In some embodiments, where the response is positive, the EC 102 sends a message 246 to the BOS 118 indicating that the package has been delivered, and accordingly, the BOS 118 will update the tracking information in the DB 202 via a similar message 248 indicating that the package associated with the scanned barcode has been delivered to its destination.

In some embodiments, where the response 240 is a positive response, the EC 102 notifies 244 the recipient's mobile (RM) 206 via a message that a package addressed to the recipient has been received. The recipient may receive the message via various means including but not limited to email, voice message, text, and/or alert and other means of notifications/messaging.

If the response 240 is a negative response, for example "access denied", the EC 102 will not open the door. In some embodiments, the EC 102 may display a message on the display 122 for the delivery person that the access is denied. The EC 102 may include the reason for denying access, which could be one or more of the following: the carrier is not a recognized carrier; package is not "in transit" or "out for delivery"; and last update status is not within the past 24 hours. The reason for denying access can be provided in the response 240 provided by the SC 102. The reason for denying access may be useful to the delivery person in verifying the package at the delivery person's carrier center where more information about the package can be obtained.

In some embodiments, where the response 240 is a positive response, the EC 102 may notify the recipient's mobile (RM) 206 via a message that a package addressed to the recipient is expected to be received. The recipient may receive the message via various means including but not limited to email, voice message, text, app notification and/or alert and other means of notifications/messaging.

Where access has been granted at step 242, the EC 102 may send a message 246 to the BOS 118 indicating that the package is expected to be deposit. Accordingly, the BOS 118 will update the tracking information in the DB 202 via a similar message 248 indicating that the package associated with the scanned barcode is expected to be deposited at the recipient's assigned locker.

Figure 3:
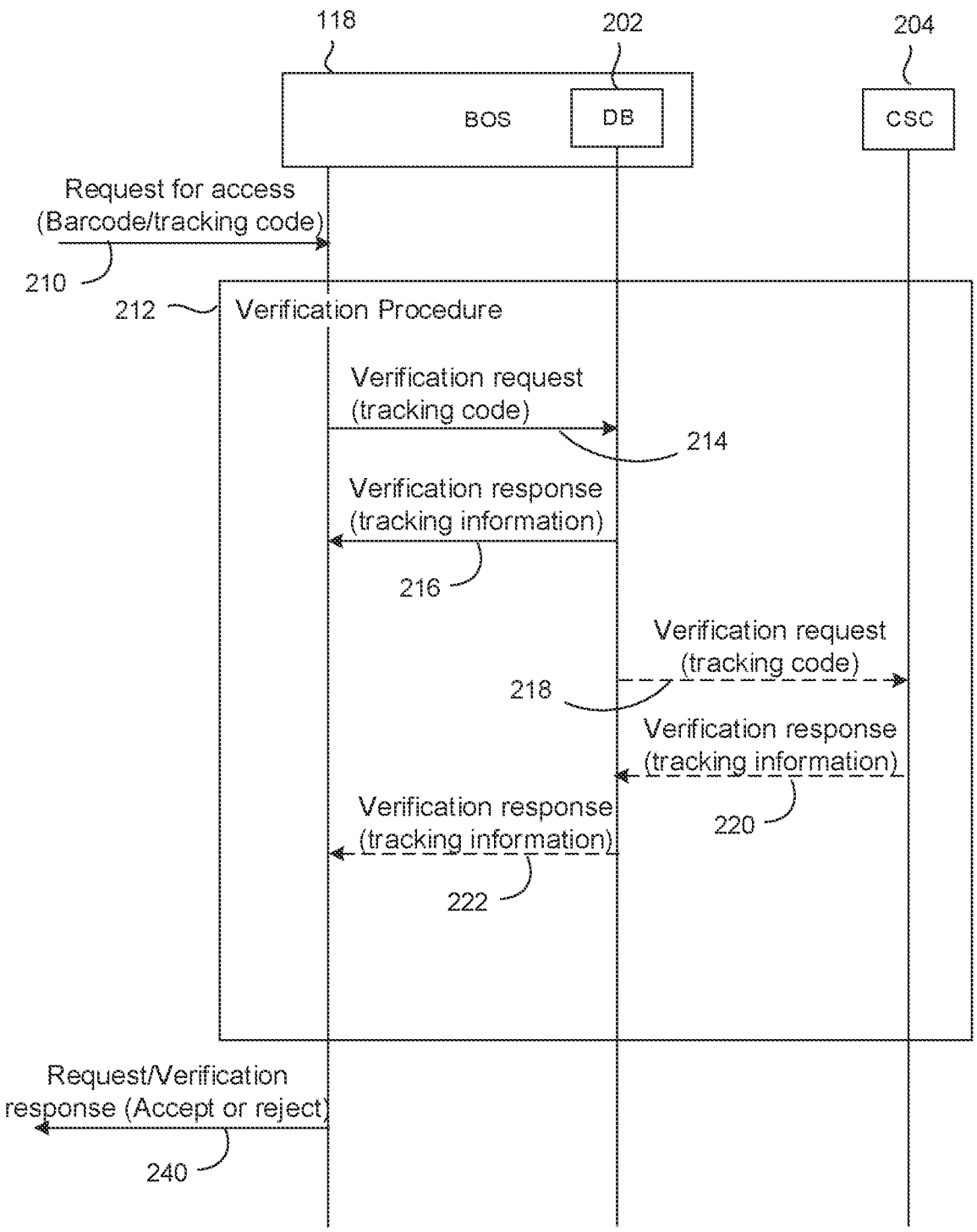
FIG. 3 is a call flow diagram of the verification procedure discussed in FIG. 2 according to an embodiment of the present invention.
Figure 4:
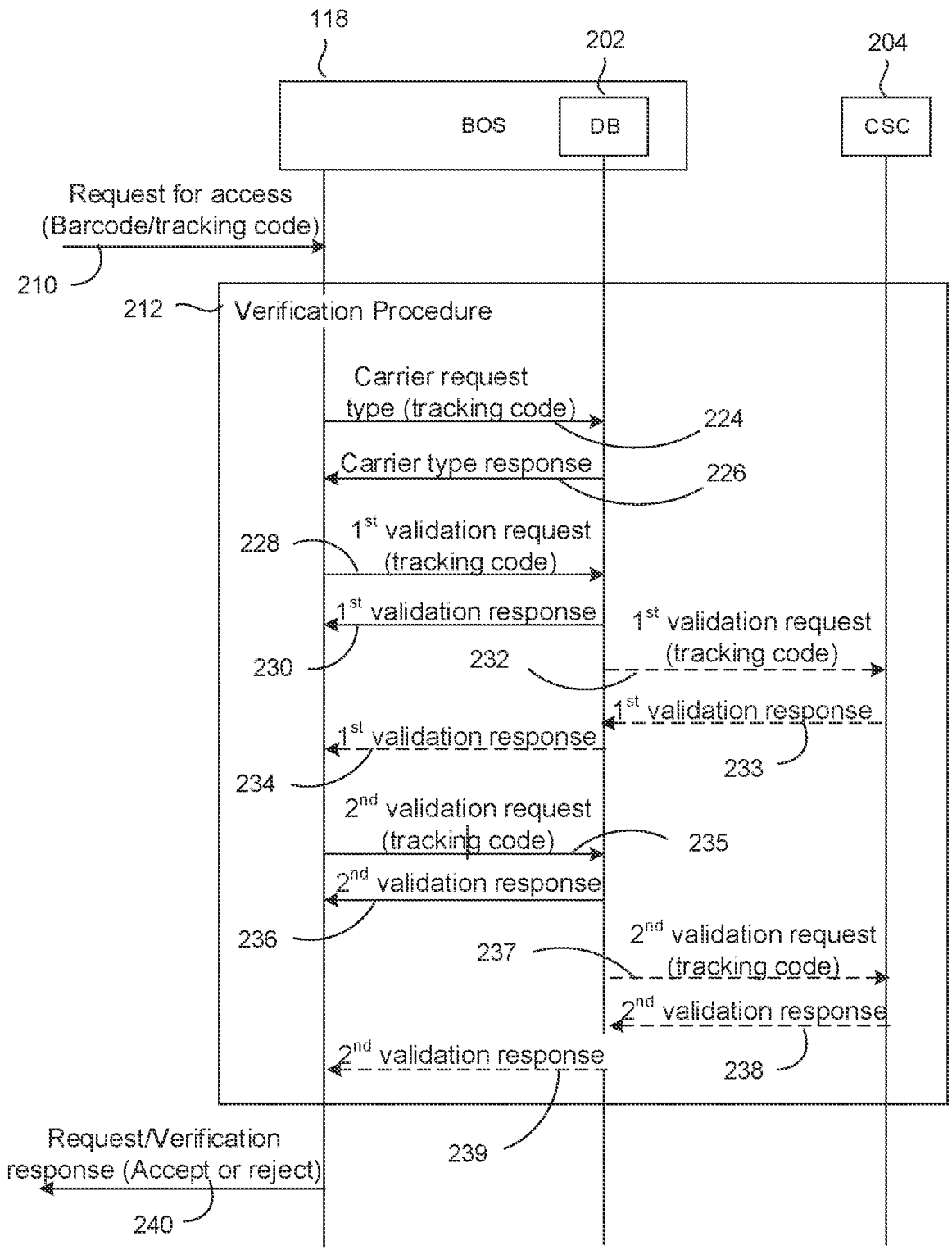
FIG. 4 is another call flow diagram of the verification procedure discussed in FIG. 2 according to an embodiment of the present invention.

FIG. 3 and FIG. 4 are call flow diagrams of the verification procedure 212 discussed in FIG. 2 according to embodiments of the present invention.

Referring to FIG. 3, when the BOS 118 receives the retrieved information including the unique tracking code 210, the BOS 118 sends a verification request 214 including the retrieved information to its local DB 202. The request 214 requests the following information: the carrier type associated with the tracking code; whether the package associated with the tracking code has a delivery status of either "in transit" or "out for delivery"; and whether the last delivery status update associated with the tracking code is within the last 24 hours. The local DB 202 includes a list of recognized/registered carrier types including but not limited to, United Parcel Service (UPS), FedEx, Dalsey Hillblom Lynn (DHL), Canada Post, Purolator and Intelcom Express. For each carrier type, the local DB 202 may receive updates from the CSC 204 on the status of package deliveries destined for the building.

At step 216, If the DB 202 has been updated by the CSC 204 with the status of the package delivery requested information, the DB 202 responds by providing a verification response providing tracking information 216 associated with the tracking code to the BOS 118.

Where the DB 202 determines that the carrier type of the tracking code is a registered carrier type with BOS 118 but is unable to determine whether the delivery status of the package is either "in transit" or "out for delivery", the DB 202 may forward a request 218 to the carrier's server cloud 204 of the determined carrier. Where the DB 202 determines the carrier type of the tracking code but is unable to determine whether the last delivery status update of the package associated with the tracking code is within the last 24 hours, the DB 202 may also forward the request 218 to the server cloud 204 of the determined carrier.

In some embodiments (not shown), the BOS 118 may forward the request 218 to the CSC 204, instead of the DB 202 sending the request 218 to the CSC 204. Upon receiving the request 218, the CSC 204 can search its internal network, including the GBS-based vehicles to locate the delivery vehicle that contains the package and record the tracking information 220 in real-time to DB 202.

Accordingly, the DB 202 provides the updated tracking information 222 to BOS 118.

The BOS 118 sends a response 240 instructing the EC 102 whether to permit or deny access to the delivery person. The BOS 118 permits access only if the following information (required information) is provided in the verification response 216 or 222: the carrier type is recognized; the delivery status associated with the tracking code is either "in transit" or "out for delivery"; and the last delivery status is updated within the last 24 hours. If any of the required information is not provided in the responses 216 and/or 222, the response 240 is a negative response, denying access to the delivery person.

FIG. 4 is alternative call flow diagram of the verification procedure 212 discussed in FIG. 2 according to embodiments of the present invention.

Referring to FIG. 4, upon receiving the request for access 210, the BOS 118 may alternatively send individual requests 224, 228, 235 to its local DB 202 for the required information in verifying the package as part of the verification procedure 212. The BOS 118 sends a carrier request 224 to the DB 202, including in the request the retrieved tracking code.

If the DB 202 recognizes the carrier type as a registered carrier type with BOS 118, then the DB 202 responds positively with the name of carrier type. Otherwise, the DB may provide a negative respond. The negative response can be a no response, or a message to the BOS 118 that the DB does not recognize the carrier type of the tracking code. If the BOS 118 receives a negative response for carrier type, the BOS 118 accordingly sends a negative response at step 240 denying access to the delivery person.

Where the BOS 118 receives a carrier type response 226 recognizing the carrier type of the tracking code, BOS 118 sends a first validation request 228 to DB 202 requesting whether the delivery status associated with the tracking code is either "in transit" or "out for delivery".

The DB 202 may respond that the delivery status is either "in transit" or "out for delivery", provided DB 202 has been updated by the CSC 204. The DB 202 may provide a negative response to the request 228; the negative response may be that DB has no information on the delivery status or a current delivery status other than "in transit" and "out for delivery" is associated with the tracking code.

Where the DB 202 provides a negative response, the DB 202 may forward the first validation request 232 to the server cloud 204 of the recognized carrier type.

The CSC 204 can search its own network, including the GBS-based vehicles to locate the delivery vehicle that contains the package and record the tracking information 233 in real-time to DB 202. The tracking information 233 may include an update to the delivery status indicating "in transit" or "out for delivery": and accordingly, the DB 202 forwards the tracking information 234 to BOS 118.

If the response 234 is a negative response, meaning that the response does not include a delivery status that is one of "in transit" or "out for delivery" then the BOS 118 sends a negative response at step 240 the EC 102 denying access to the delivery person.

If the validation response 232 or 234 is a positive response indicating that the delivery status associated with the tracking code is one of "in transit" or "out for delivery", then the BOS 118 sends a second validation request 235, requesting the DB 202 if the last update status associated with the tracking code was within the last 24 hours.

It should be noted that BOS 118 can request the first 228 and second 235 validation requests in any order; and in some embodiments the BOS 118 may only ask for one validation request including both the first and second validation requests in one request.

The DB 202 may provide a positive or a negative response 236 to the BOS 118. The positive response being that the last update status is within the last 24 hours and the negative response is that the last update status is not within the last 24 hours. If the DB 202 was last updated by the CSC 204, then the response 236 is a positive response, otherwise response 236 is a negative response.

Where the DB 202 provides a positive response 236 to BOS 118, having also provided a positive response for carrier type 226 recognizing a carrier type and a positive response 230 for the first validation request 228, then the BOS 118 sends a positive verification response 240 to the EC 102 allowing access to the delivery person.

Where the DB provides a negative response 236, the DB may forward the request 237 for the second validation request to the carrier's server cloud 204 of the recognized carrier. The CSC 204 can search its own network, including the GBS-based vehicles to locate the delivery vehicle that contains the package and record the tracking information 233 in real-time to DB 202. The tracking information 238 may include an update to the delivery status; and accordingly, the DB 202 forwards the tracking information 239 to BOS 118, indicating a status update within the last 24 hours.

If the response 239 is a negative response, meaning that the response indicates a last update status beyond the last 24 hours, the BOS 118 sends a negative response 240 the EC 102 denying access to the delivery person.

Figure 5:
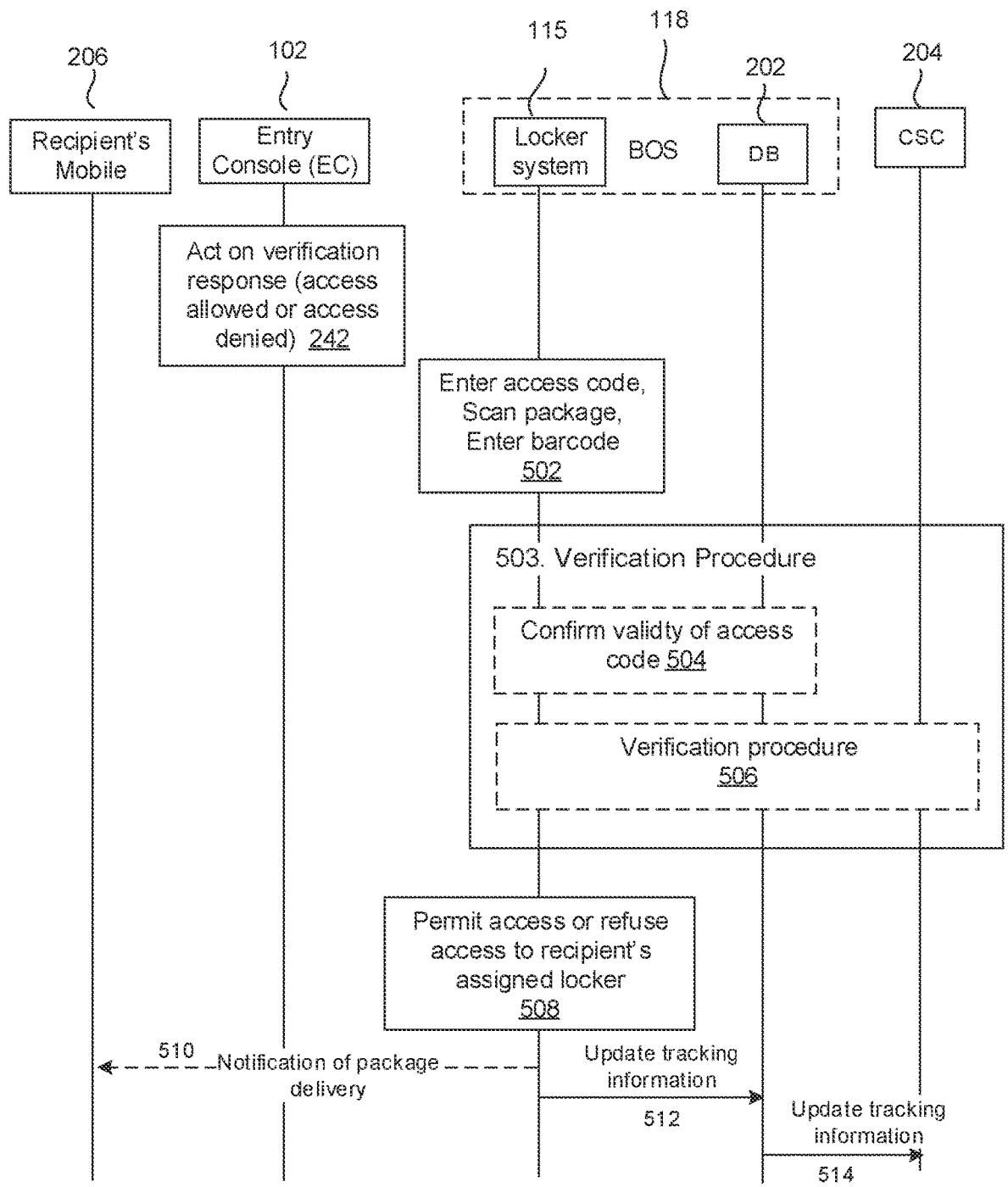
FIG. 5 illustrates a call flow diagram for depositing a package using the locker system, according to embodiments of the present invention.

FIG. 5 illustrates a call flow diagram for depositing a package using the locker system, according to embodiments of the present invention.

As discussed in step 242 of FIG. 1, where the response is a positive response, the EC 102 will permit the delivery person to have access to the locker system 115 for depositing the package at the recipient's assigned locker/mail box.

Referring to FIG. 5, the locker system 115 includes a plurality of locker/mail boxes, each assigned to a registered tenant/recipient of the building, as determined by the BOS 118. The locker system 115 may be separate from or part of the BOS 118, but must be able to communicate with the BOS 118.

Where the delivery person has been permitted access to the locker system at step 242, the delivery person may proceed to depositing the package.

At step 502, the delivery person may enter the access code that was displayed on the EC's display 122 at step 242. Alternatively, the delivery person, using the barcode scanner of the locker system 115, may scan the package's bar code or manually enter the barcode.

The access code may have a limited validation window during which the delivery person must use to deposit the package at the locker system.

At steps 503 and 504, where the access code is used to access the recipient's locker, the locker system may confirm validity of the access code. The locker system 115 confirms the validity of the access code by confirming that the time window has not expired, and further confirming that the access code is associated with a recorded verification response in the local DB 202 and message at step 246 and/or 248 that the package is expected to be deposited at the locker system 118.

At steps 503 and 506, where the validation window for the access code has expired, or the delivery person has decided to scan or manually input the bar code to access the recipient's locker, then the locker system 115 along with the local DB 202 and the CSC 204 performs the verification procedure as described with reference to step 212 of FIG. 2, and further described in FIG. 3 and FIG. 4.

At step 508, If the verification procedure at step 503 results in a confirmation of the validity of access code at step 504 or a positive response to the verification procedure at step 506, then the locker system will permit access to the recipient's locker.

If at step 504 the access code determined not be valid, then the locker system will deny access to the recipient's locker and display a message. The message may indicate that the delivery person should attempt to deposit package using the barcode. Further the message may indicate that the validation window has expired. The message may also indicate that the access code is not associated with a verified response (referring to the response at step 240 of FIGS. 2, 3 and 4.

If the verification procedure 506 results in a negative response, then the locker system 115 will refuse access to the recipient's locker and display a message. The message may indicate the reason for the negative response as was discussed above, and reproduced here for convenience. The reason for refusing access may be one or more of the following: unregistered recipient; the carrier is not a registered carrier; package is not "in transit" or "out for delivery"; and last update status is not within the past 24 hours.

At step 510, where the delivery person is permitted access to the recipient's assigned locker at step 508, the locker system 115 may notify the recipient's mobile (RM) 206 via a message that a package addressed to the recipient has been received. The recipient may receive the message via various means including but not limited to email, voice message, text, app notification and/or alert and other means of notifications/messaging.

At step 512 and 514, where access has been granted at step 508, the locker system 115 will update the tracking information in the DB 202 via a message indicating that the package associated with the scanned barcode has been deposited at the recipient's assigned locker.

At step 514, the local DB 202 will then notify the CSC 204 that the package has been received at the recipient's address.

Example embodiments described herein provide methods and systems for access to a secured building. Although example embodiments are described in reference to a service provider delivering a package, a person skilled in the art may apply the methods and systems as described by example embodiments herein for access to a building in the case of other service providers, who require access to the building. Accordingly, delivery a package is but one example of a service provider, and thus the methods and systems described herein are not limited to such example.

An statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Other embodiments consistent with the present disclosure will be apparent from consideration of the specification and the practice of the disclosure disclosed therein. Accordingly, the specification and the embodiments disclosed therein are to be considered examples only, with a true scope of the disclosure being disclosed by the following numbered claims.

I claim:

1. A real-time method of accessing, by delivery personnel for delivery of a package to a locker in a locker system of a multi-tenant building or portion thereof (MTBOPT), the method comprising:
   obtaining, by an entry console of the MTBOPT, in accordance with a unique code associated with the package to be delivered, a tracking code associated with the package and a recipient address of the package to be delivered;
   forwarding, by the entry console, the tracking code and the recipient address to a building operating system (BOS);
   performing, by the BOS, a first verification procedure based on the tracking code and on the recipient address, the first verification procedure comprising:
      sending, by the BOS, a first verification request comprising the tracking code to one or more databases, the one or more databases comprising tracking information for a plurality of packages that include the package to be delivered, the tracking information including a delivery status for each of the plurality of packages and a delivery address for each of the plurality of packages;
   obtaining, by the BOS, in accordance with the one or more databases, the delivery status and the delivery address of the package to be delivered, the delivery status of the package to be delivered being out for delivery and the recipient address matching the delivery address; and
      determining, by the BOS, in accordance with the delivery status being out for delivery and the recipient address matching the delivery address, that access to the MTBOPT is permitted;
         updating, by the BOS, in accordance with access to the MTBOPT being permitted, the tracking information comprised in the one or more databases; and
         causing, by the BOS, the entry console to open a door of the MTBOPT;
      obtaining, by the locker system, a request to access the locker, wherein the request to access the locker comprises an access code associated with the package to be delivered; and
      forwarding, by the locker system, the access code to the BOS;
      performing, by the BOS, a second verification procedure based on the access code, the second verification procedure comprising:
         sending, by the BOS, a second verification request comprising the access code to the one or more databases;
         receiving, by the BOS, a time window associated with the package and during which the package to be delivered is to be deposited in the locker;
         comparing the access code in the second verification request to the tracking information in the one or more databases; and
         determining that the time window has expired or that the tracking information in the one or more databases indicates access to the MTBOPT is not granted;
         subsequent to determining that the time window has expired or that the tracking information in the one or more databases indicates access to the MTBOPT is not granted, obtaining, by the locker system, in accordance with the unique code associated with the package to be delivered, the tracking code associated with the package and the recipient address of the package to be delivered; and
         forwarding, by the locker system, the tracking code and the recipient address to the BOS;
      performing, by the BOS, a third verification procedure based on the tracking code and on the recipient address, the third verification procedure comprising:
         sending, by the BOS, another verification request comprising the tracking code to the one or more databases;
         obtaining, by the BOS, in accordance with the one or more databases, the delivery status and the delivery address of the package to be delivered, the delivery status being out for delivery and the delivery address matching the recipient address; and
         determining, by the BOS, in accordance with the delivery status being out for delivery and the delivery address matching the recipient address, that access to the locker is granted; and
      updating, by the BOS, the tracking information comprised in the one or more databases; and
      causing, by the BOS, the locker system to open a door of the locker.

2. The method of claim 1, wherein updating the tracking information includes updating the tracking information in real-time.

3. The method of claim 1, wherein the first verification procedure further comprises determining if the delivery status has been updated within the last 24 hours.

4. The method of claim 1, wherein the locker is assigned to a tenant of the MTBOPT.

5. The method of claim 1, wherein at least one of the unique code, the tracking code and the access code is a barcode, the barcode being one of: a 1 dimensional linear bar code, a 2-dimensional bar code, an image, a specialized augmented postal code, an intelligent mail barcode, and an electronic product code.

6. The method of claim 1, further comprising:
   sending a message to a device associated with the recipient address, the message indicating that access to the locker has been granted to the delivery personnel.

7. The method of claim 6, wherein the device is a mobile device of a tenant associated with the recipient address.

8. The method of claim 1, wherein two of the unique code, the tracking code and the access code are identical.

9. The method of claim 2, wherein the tracking information is updated continuously.

10. A non-transitory computer-readable medium storing instructions that when executed by one or more processors cause the one or more processors to perform a real-time method of accessing, by delivery personnel for delivery of a package to a locker in a locker system of a secured multi-tenant building or portion thereof (MTBOPT), the method comprising:
obtaining, by an entry console of the MTBOPT in accordance with a unique code associated with the package to be delivered, a tracking code associated with the package and a recipient address of the package to be delivered;
forwarding, by the entry console, the tracking code and the recipient address to a building operating system (BOS);
performing, by the BOS, a first verification procedure based on the tracking code and on the recipient address, the first verification procedure comprising:
sending, by the BOS, a first verification request comprising the tracking code to one or more databases, the one or more databases comprising tracking information for a plurality of packages that include the package to be delivered, the tracking information including a delivery status for each of the plurality of packages and a delivery address for each of the plurality of packages;
obtaining, by the BOS, in accordance with the one or more databases, the delivery status and the delivery address of the package to be delivered, the delivery status of the package to be delivered being out for delivery and the recipient address matching the delivery address; and
determining, by the BOS, in accordance with the delivery status being out for delivery and the recipient address matching the delivery address, that access to the MTBOPT is permitted; and
updating, by the BOS, in accordance with access to the MTBOPT being permitted, the tracking information comprised in the one or more databases; and
causing, by the BOS, the entry console to open a door of the MTBOPT;
obtaining, by the locker system, a request to access the locker, wherein the request to access the locker comprises an access code associated with the package to be delivered; and
forwarding, by the locker system, the access code to the BOS;
performing, by the BOS, a second verification procedure based on the access code, the second verification procedure comprising:
sending, by the BOS, a second verification request comprising the access code to the one or more databases;
receiving, by the BOS, a time window associated with the package;
comparing the access code in the second verification request to the tracking information in the one or more databases; and
determining that the time window has expired or that the tracking information in the one or more databases indicates access to the MTBOPT is not granted;
subsequent to determining that the time window has expired or that the tracking information in the one or more databases indicates access to the MTBOPT is not granted, obtaining, by the locker system, in accordance with the unique code associated with the package to be delivered, the tracking code associated with the package and the recipient address of the package to be delivered; and
forwarding, by the locker system, the tracking code and the recipient address to the BOS;
performing, by the BOS, a third verification procedure based on the tracking code and on the recipient address, the third verification procedure comprising:
sending, by the BOS, another verification request comprising the tracking code to the one or more databases;
obtaining, by the BOS, in accordance with the one or more databases, the delivery status and the delivery address of the package to be delivered, the delivery status being out for delivery and the delivery address matching the recipient address; and
determining, by the BOS, in accordance with the delivery status being out for delivery and the recipient address matching the delivery address, that access to the locker is granted; and
updating, by the BOS, the tracking information comprised in the one or more databases; and
causing, by the BOS, the locker system to open a door of the locker.

11. The non-transitory computer-readable medium of claim 10, wherein the one or more databases are updated in real-time at various stages of the delivery.

12. The non-transitory computer-readable medium of claim 10, wherein the first verification procedure further comprises determining if the delivery status has been updated within the last 24 hours.

13. The non-transitory computer-readable medium of claim 10, wherein the locker is assigned to a tenant of the MTBOPT.

14. The non-transitory computer-readable medium of claim 10, wherein at least one of the unique code, the tracking code and the access code is a barcode, the barcode being one of: a 1 dimensional linear bar code, a 2-dimensional bar code, an image, a specialized augmented postal code, an intelligent mail barcode, and an electronic product code.

15. The non-transitory computer-readable medium of claim 10, wherein the method further comprises sending a message to a device associated with the recipient address, the message indicating that access to the locker has been granted for the delivery personnel.

16. The non-transitory computer-readable medium of claim 15, wherein the device is a mobile device of a tenant associated with the recipient address.

17. The non-transitory computer-readable medium of claim 11, wherein the tracking information is updated continuously.

18. A system for accessing the MTBOPT a secured building according to the method of claim 1, the system comprising the entry console in network connection with the BOS and one or more I/O devices.

* * * * *